(12) United States Patent
Hsu et al.

(10) Patent No.: US 7,077,637 B2
(45) Date of Patent: Jul. 18, 2006

(54) FORCE DETECTING CONTROLLING DEVICE OF A SCREW FOR AN INJECTION MOLDING MACHINE

(75) Inventors: Chia-Chun Hsu, KeeLung (TW); Wann-Fu Su, Hsinchu (TW); Ming-Chi Chen, YiLan (TW); Chuan-Feng Chen, TuCheng (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 10/435,539

(22) Filed: May 12, 2003

(65) Prior Publication Data

US 2004/0071809 A1   Apr. 15, 2004

(30) Foreign Application Priority Data

Oct. 9, 2002   (TW) ............................. 91216088 U

(51) Int. Cl.
*B29C 45/77*   (2006.01)
(52) U.S. Cl. .................. 425/145; 425/140; 425/594; 425/595
(58) Field of Classification Search .............. 425/145, 425/149, 594, 595
See application file for complete search history.

(56) References Cited

U.S. PATENT DOCUMENTS

| | | | | |
|---|---|---|---|---|
| 3,669,599 A | * | 6/1972 | Snider et al. | 425/595 |
| 5,421,712 A | * | 6/1995 | Laing et al. | 425/145 |
| 5,932,155 A | * | 8/1999 | Ingram | 264/40.5 |
| 5,955,117 A | * | 9/1999 | Ito et al. | 425/145 |
| 2003/0219509 A1 | * | 11/2003 | Yoshioka | 425/594 |

* cited by examiner

*Primary Examiner*—Tim Heitbrink
(74) *Attorney, Agent, or Firm*—Troxell Law Office, PLLC

(57) ABSTRACT

The present invention is a force detecting controlling device for a screw of an injection molding machine, which utilities a load cell as a force sensor for injection, holding pressure and back pressure. The load cell arranged on a rear fixed plate directly detects a force applied onto a ball screw nut. Because the ball screw nut is fastened on the load cell, and the load cell is fixed on the rear fixed plate, the force on a ball screw is directly transmitted to the ball screw nut. Therefore, a total value of the force on the ball screw produced by back pressure and friction among mechanical parts are equal to a force value of the ball screw nut applying onto the load cell. The injection force detected via the load cell for an instant response reaches a close loop control and procedures of holding pressure and back pressure are specifically controlled as well.

14 Claims, 8 Drawing Sheets

FORCE DETECTING CONTROLLING DEVICE OF A SCREW FOR AN INJECTION MOLDING MACHINE

FIELD OF THE INVENTION

The present invention relates to a force detecting controlling device for a screw of an injection molding machine, especially the device using a load cell installed between a rear fixed plate and a ball screw nut to detect a pressure of an injecting screw for controlling injection force, holding pressure and back pressure.

BACKGROUND OF THE INVENTION

As a result of manufacturing precision products in the injection molding field, the injection speed, precision and pressure may be controlled by various devices. An electrical injection molding machine adopts a servomotor that can process feedback control for speed and position, but it cannot detect the injection force. One way to resolve this problem is to install a load cell to measure the axial force of the screw. In the prior arts, due to the arrangement and rigidity of the load cell, it does not make a close loop to force when fastening mechanical parts as is required to correctly measure the real value of the axial force. On the other hand, the friction causes a sluggish condition during injection, such that the injection force and the friction cannot be determined by the load cell simultaneously, thus the axial force during delivery does not compensate for the lost force over time. As the experience form the prior art, the precise injection force measurement, holding pressure and back pressure control for the high-speed and accurate injection are not workable.

Controlling the pressure path of the injection force of the injection molding machine, and knowing a force value accepted by a screw instantly and accurately is very important. The load cell measures the force, and then the controlling system compensates for a difference between the measured force value and a pre-setting value controlling injection, holding pressure and metering back pressure.

Please refer to FIG. 1, which is a first embodiment in prior arts and a patent of 5421,712 of the United States, called "Screw Rotating and Advancing Device for An Injection Molding Machine". A load cell 39' arranged on a moving plate 23' accepts an axial force that a protruding collar 471' of a connecting block 47' applying on a thrust bearing 45'. Therefore, the axial force is transferred to a strain voltage value by the load cell 39'. Further the strain voltage value is inputted into a control system (not shown in the figure) via an load cell amplifier (not shown in the figure). The control system corrects an output of an injection servomotor (not shown in the figure) according to aforesaid difference in the previous paragraph for appropriately controlling injection force and approaching a purpose of pressure control of a close loop.

FIGS. 2A and 2B are two sectional view of the first embodiment in prior arts. FIG. 2A shows a path for the axial force in delivery during injection and holding pressure. Movement between a ball screw 34' and a ball nut (not shown in the figure and normally positioned above the ball screw 34') generates an axial pushing force, then passing through a thrust bearing 37', a bearing housing 371', a compressing seat 391', the load cell 39', a connecting block 48', the moving plate 23', continuously to a thrust bearing 45', the protruding collar 471', a half ring 171' and the screw 17', shown as a line A. Partial force transmits to the compressing seat 391' and then to the connecting block 48', shown as a line B. Other partial force is to moving plate 23', shown as a line C, then both are to the connecting block 47' and the screw 17' via the thrust bearing 45' and a bearing compressing plate 46'.

FIG. 2B shows a path of metering back pressure. For a line A', partial force transmits to load cell 39' via the half ring 171', connecting block 47' and thrust bearing 45'. Most other force transmits to connecting block 48' by way of the bearing compressing plate 46' or thrust bearing 45', shown as a line B', and to moving plate 23', shown as line C'. Aforesaid three force lines are combined at load cell 39', and a combined force goes to ball screw 34' through compressing seat 391', bearing housing 371' and thrust bearing 37'.

No matter what the condition is in injection, holding pressure (shown as FIG. 2A_or metering back pressure (shown as FIG. 2B), the force can not be delivered to load cell 39' precisely and accurately because of many other branch forces, it derives a result that the measured injection pressure, holding pressure and metering back pressure are not exactly same as the realism of screw 17' accepted. When injection or metering is in execution, the friction from moving plate 23' and a guiding rod 22' is variable with the moving speed of moving plate 23', lubrication degree and other environmental factors. The uncertainty cannot be neglected. to reimburse the disadvantageous may well be the way to approach the purpose of precision injection. In the patent of U.S. Pat. No. 5,421,712, the measured injection force and friction force of load cell 39' are unreal to cause insufficient signal for compensating injection force. Therefore the control of injection force, holding pressure and metering back pressure is barely made.

Please refer to FIG. 3, which is a second embodiment in prior arts and a load cell arrangement of a patent of U.S. Pat. No. 5,955,117. Firstly, bolts 34" fasten a load cell 33" and a ball nut 31". Secondly, bolts 32" fasten the load cell 33" on a rear plate 3". While a ball screw 28" is axially rotating, the rotation is a relative motion with the ball nut 31" on the rear plate 3". When the ball screw 28' rotates and moves toward a left, ball nut 31" is received an opposite force, which is toward a right. The reason to build up the motion is that ball nut 31" contacts with a left internal surface of load cell 33", the force is then transmitted to load cell 33". Referring to FIG. 4, a left external side of load cell 33" is bounded by bolts 32". FIG. 4 is a view of force analysis of the load cell of the second embodiment in prior arts. Load cell 33" is applied by two forces, one is the trusting force X of ball nut 31', another is the tensile force X' of bolts 32'. Due to the deformation of the bolts causing a difference and sluggishness of a trusting force X and a tensile force X', the measured axial force is not a true value.

Through many years experience in manufacture, devoted study, continuous research, experimental analysis, and improvement, the inventor finally proposes an invention that can reasonably and effectively improve the shortcomings of the prior arts.

SUMMARY OF THE INVENTION

The main object of the invention is to provide a force detecting controlling device for a screw of an injection molding machine, which comprises a front fixed plate, a rear fixed plate, a ball screw, at least two guiding rods, a moving plate, a load cell, an injection driving device, a metering driving device and an injection screw. The present invention is to fasten an external ring of the load cell onto the rear fixed plate and a ball nut onto an internal ring of the load cell. The ball screw and the rear fixed plate do not touch each other. Therefore, the load cell accepts all axial forces during injection, holding pressure and metering back pressure.

The second objective of the present invention is to provide a detecting method for a force-detecting device of an injection screw of an injection molding machine, by comparing the force of the load cell truly accepted, and a predetermined force value and instantly feeding back a result to a servomotor for compensation of an inputting force. Therefore by employing the load cell arrangement of the present invention, the detecting method of the injection screw is capable of correctly executing a closed loop pressure control of the injection, holding pressure and metering back pressure, which further increases the affection and reappearance of the pressure measurement of the injection screw and achieve the precision injection.

Based on the motivation of the high precision and high response, the present invention submits a new arrangement of the load cell. The load cell is installed on the rear fixed plate, and a ball screw nut is then fixed on the load cell, but the ball screw nut and the rear fixed plate do not actually touch each other. All axial forces are concentrated on the load cell improving accuracy of the pressure signals. Besides, while the load cell being on the ball screw nut and the servomotor driving the ball screw, the load cell receives the pressure signal immediately and then responds instantly to promote reaction speed.

As a conclusion, the present invention is an injection force-detecting device with the feature of high accuracy that overcomes the delay and branch forces distribution problems.

DETAILED DESCRIPTION OF THE INVENTION

Figure 8:
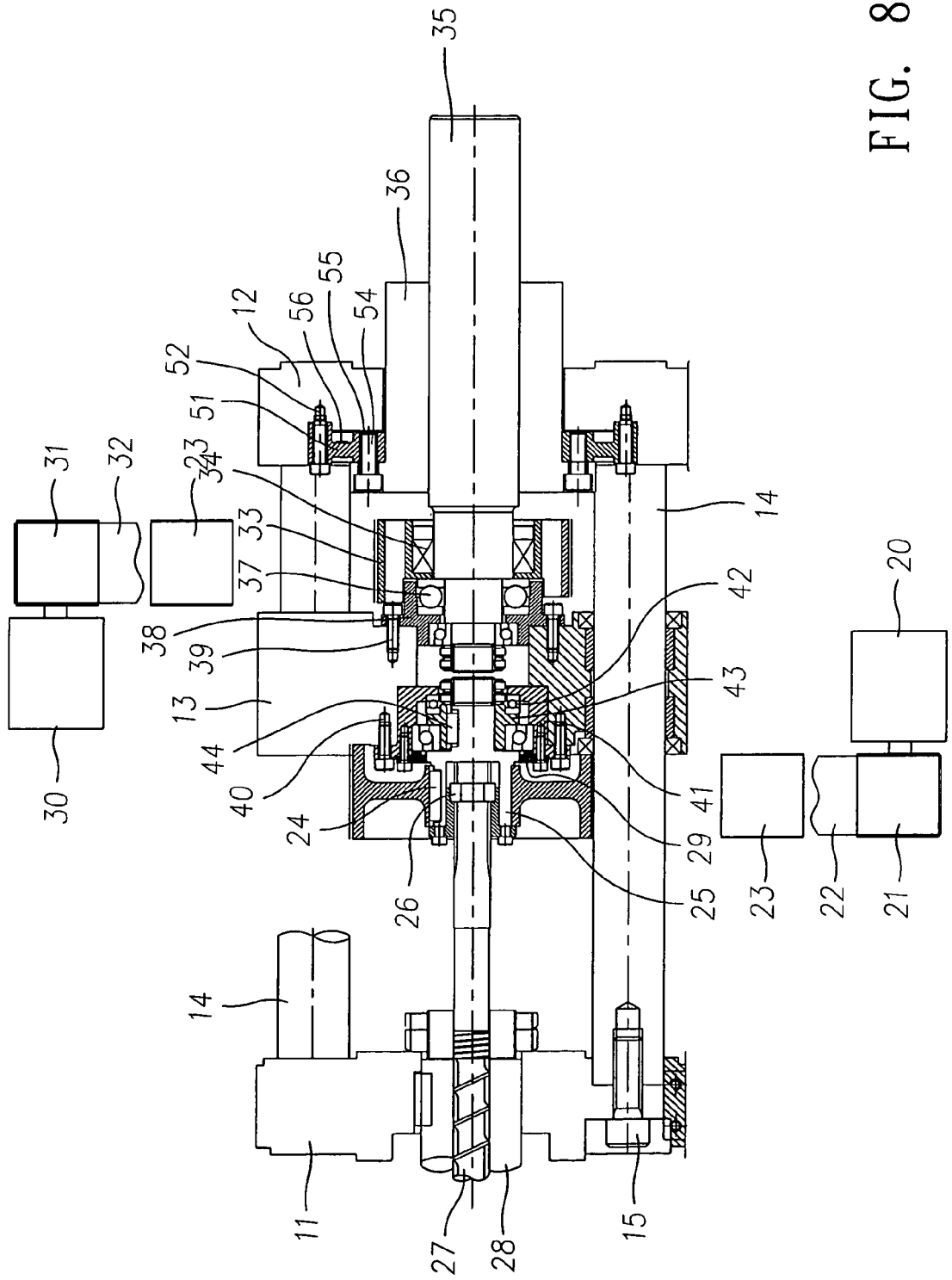
FIG. 8 is a sectional view of a preferred embodiment of the present invention.

FIG. 8 is a sectional view of an injection unit of a preferred embodiment of the present invention, which includes a front fixed plate 11, rear fixed plate 12, at least two guiding rods 14. Bolts 15 play the role to bound front fixed plate 11, rear fixed plate 12 and two guiding rods 14, further that moving plate 13 is installed on two guiding rods 14 and capable of moving back and forward. Metering servomotor 20 is mounted aside of moving plate 13, and its torque passes through the following parts: driving pulley 21, timing belt 22, driven pulley 23, key 24, screw driving shaft 25, semi-buckling ring 26 and spline plate 29; hence injection screw 27, connecting to screw driving shaft 25, which can be rotated to send polymers to the front of barrel 28 for metering.

Injection servomotor 30 is disposed aside of moving plate 13, and the torque from injection servomotor 30 passes through following parts: driving pulley 32, timing belt 32, driven pulley 33 and tollok 34; thus ball screw 35, fastened to tollok 34, which can be rotated to generate a relative axial motion between the ball screw nut 36 and a load cell 51 fixed on rear fixed plate 12. The axial force generated by the axial motion goes through thrust bearing 27, bolts 39, injection bearing housing 38 on the rear end of moving plate 13, moving plate 13, bolts 40, metering bearing housing 41 on the front end of moving plate 13, thrust bearing 42, screw driving shaft sleeve 43, key 44, screw driving shaft 25 to drive injection screw 27 moving back and forward for processing injection, holding pressure and metering back pressure.

Figure 6:
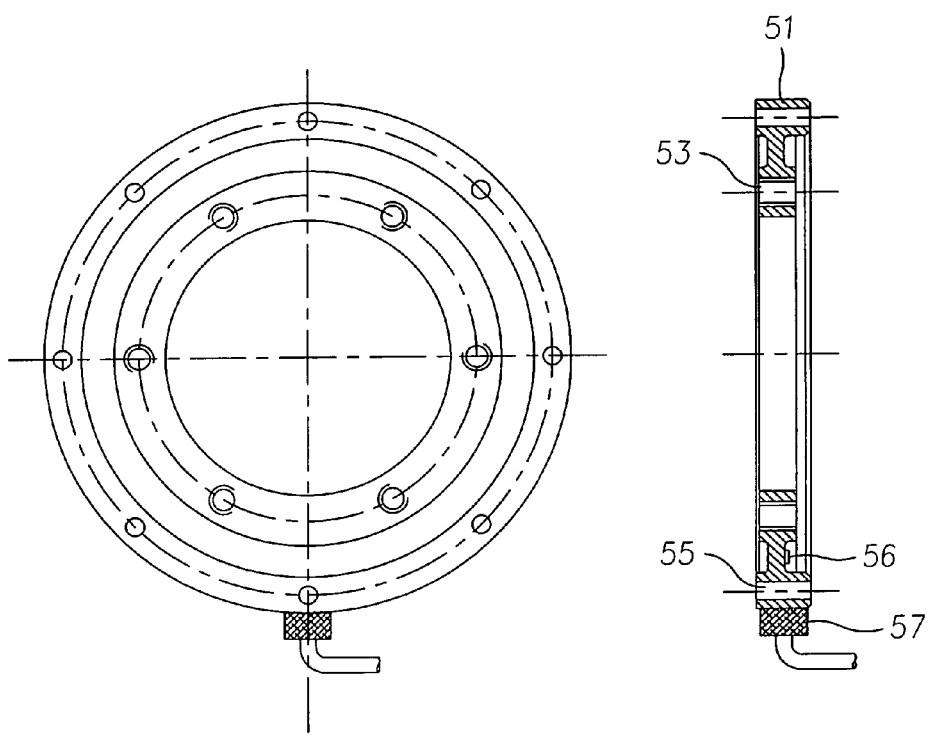
FIGS. 6A and 6B are front and side views, respectively, of a load cell of the present invention.

As illustrated in FIGS. 6A, 6B and 8, the ball screw nut 36 and load cell 51 are fastened by bolts 52 and installing holes 53. Then another set of bolts 54 and installing holes 55 play the role to fasten load cell 51 on rear fixed plate 12. During the injection, holding pressure and metering back pressure processes, the strain gauge 56 of load cell 51 accepts the axial force from ball screw nut 36, and thus the resistance value of strain gauge 56 is changed, continuously the output voltage from strain gauge 56 is altered as well. Therefore, a Wheatstone bridge assembled by the resistance of strain gauge 56 outputting the voltage variety is the true force value.

Figure 7:
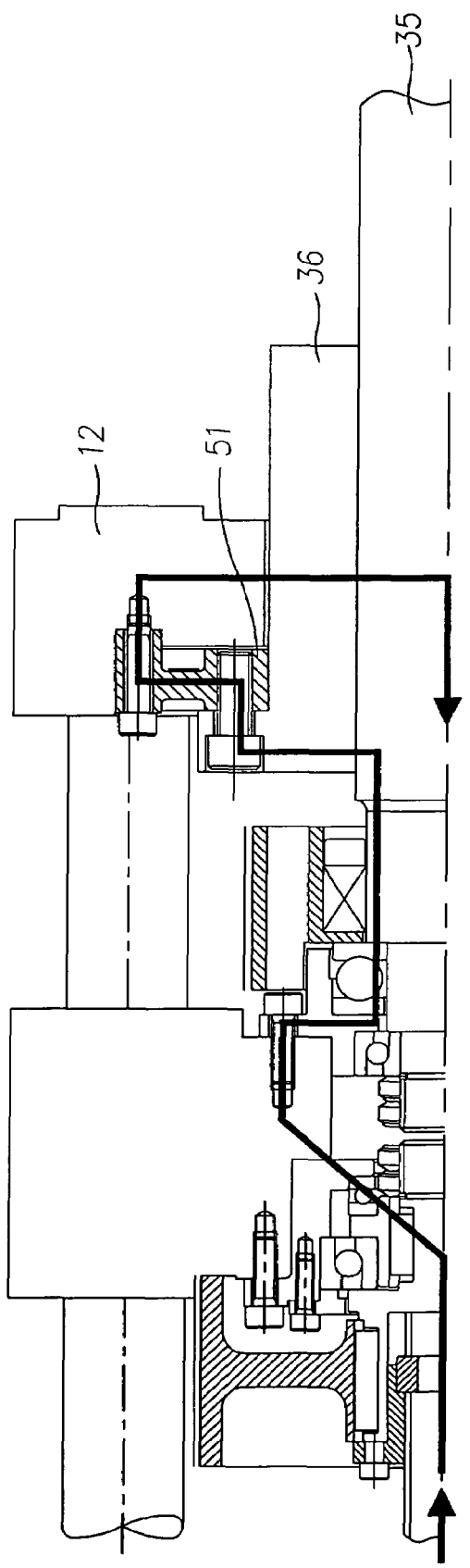
FIG. 7 is a relationship view of the force line and components of the present invention.

The advantages of the arrangement of load cell 51 are following:

1. FIG. 7 is a relationship view of the force line and components of the present invention. FIG. 8 is a sectional view of a preferred embodiment of the present invention. The description of the force line in FIG. 7 is: the ball screw nut 36 is fastened on the inner ring of a load cell 51 and the outer ring of said load cell 51 is fixed on the rear fixed plate. Ball screw 35 does not contact with rear fixed plate 12. That is, in the procedures of injection, holding pressure and metering back pressure, the injection force from injection servomotor 30 or metering servomotor 20, the back pressure from the rotation of injection screw 27 and the friction force among mechanical parts can be accurately and instantly appraised by load cell 51, so as to improve the shortcoming of unreal signals in prior arts. Which means, while the injection servomotor or the metering servomotor is working in the procedures of injection, holding pressure or metering back pressure, the injection force from the injection servomotor driving the ball screw, the back pressure from metering servomotor driving the rotation of the injection screw and the friction force among mechanical parts can be accurately and instantly appraised by the load cell.

2. While the inner ring of being fastened on load cell ball screw nut 36, and then the outer ring of load cell being directly fastened on rear fixed plate 12, it makes no friction between them, so the realism of the measured value is accurate.

3. The arrangement for load cell 51 is simple and convenient to lay out and maintain.

Figure 1:
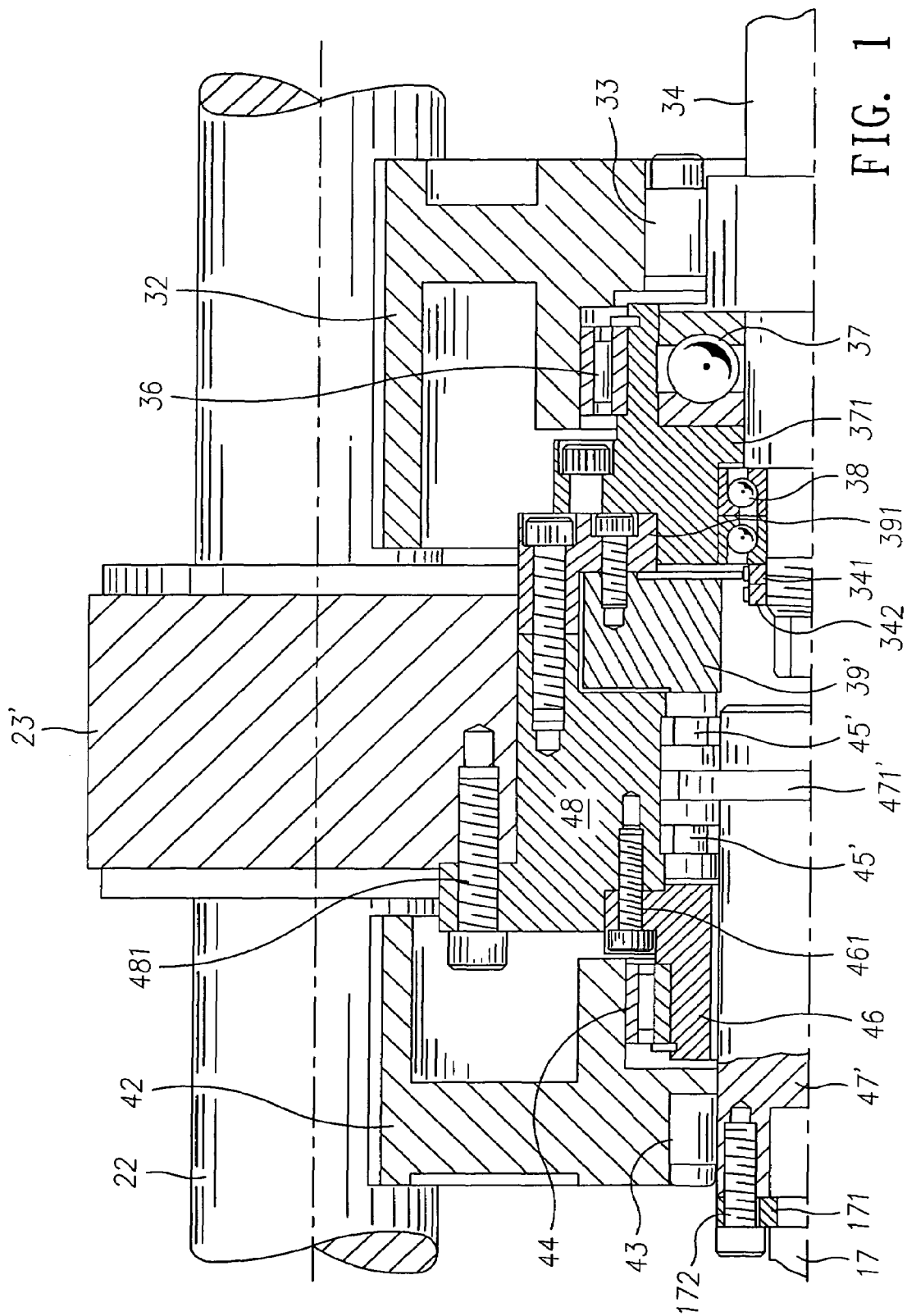
FIG. 1 is a first embodiment on prior arts.
Figure 2A:
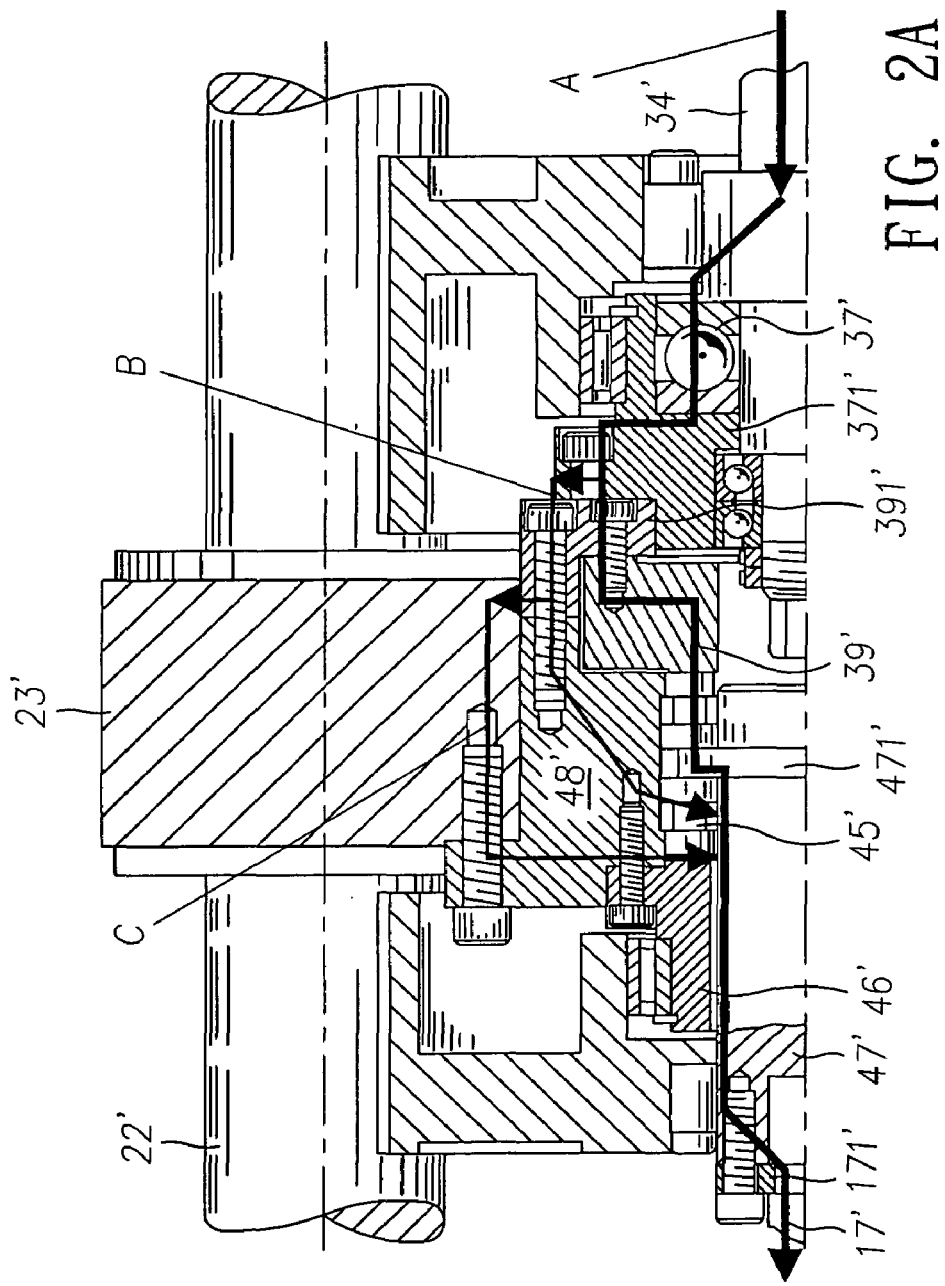
FIGS. 2A and 2B are sectional views of the first embodiment in prior arts.
Figure 2B:
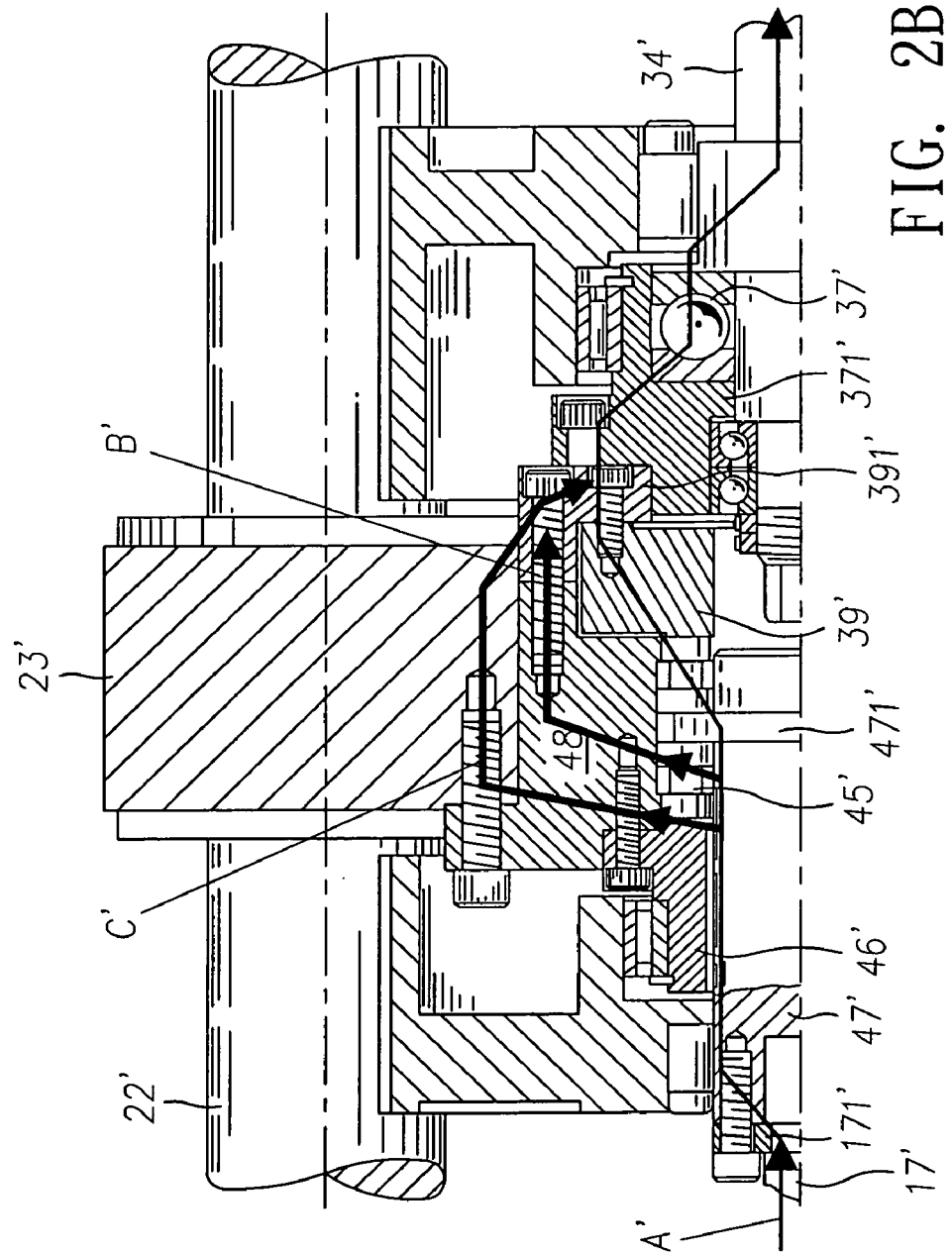
Figure 3:
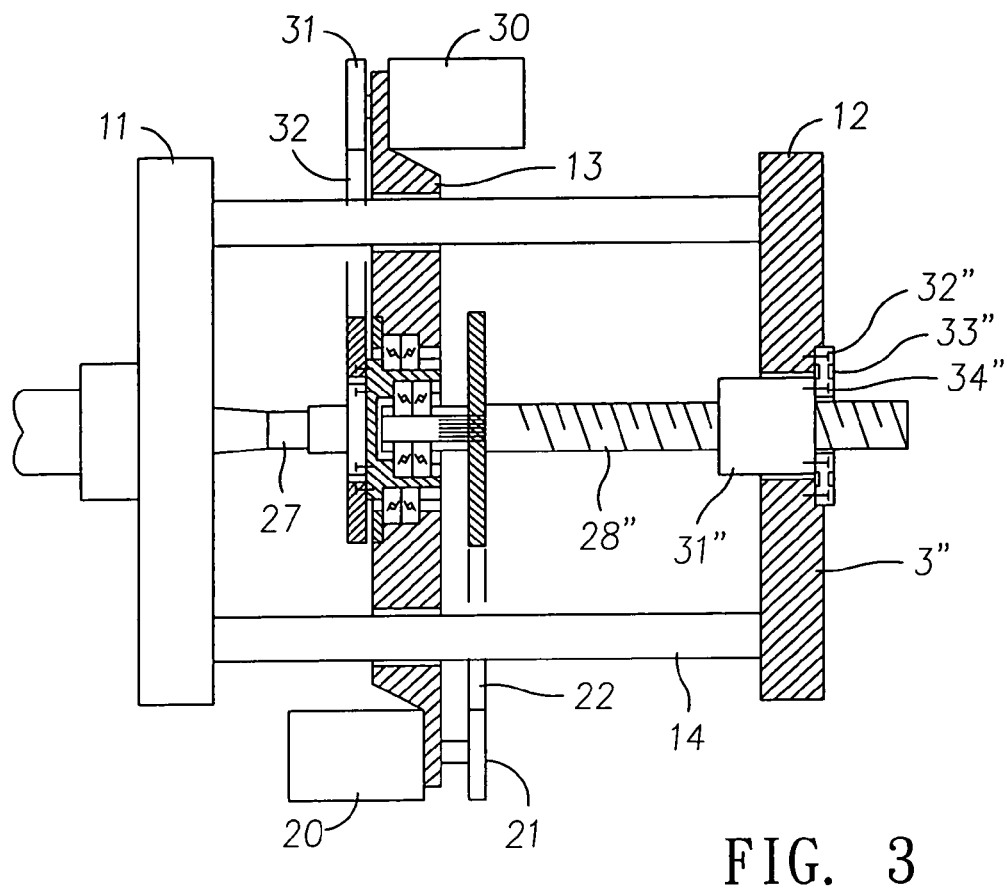
FIG. 3 is a second embodiment in prior arts.
Figure 4:
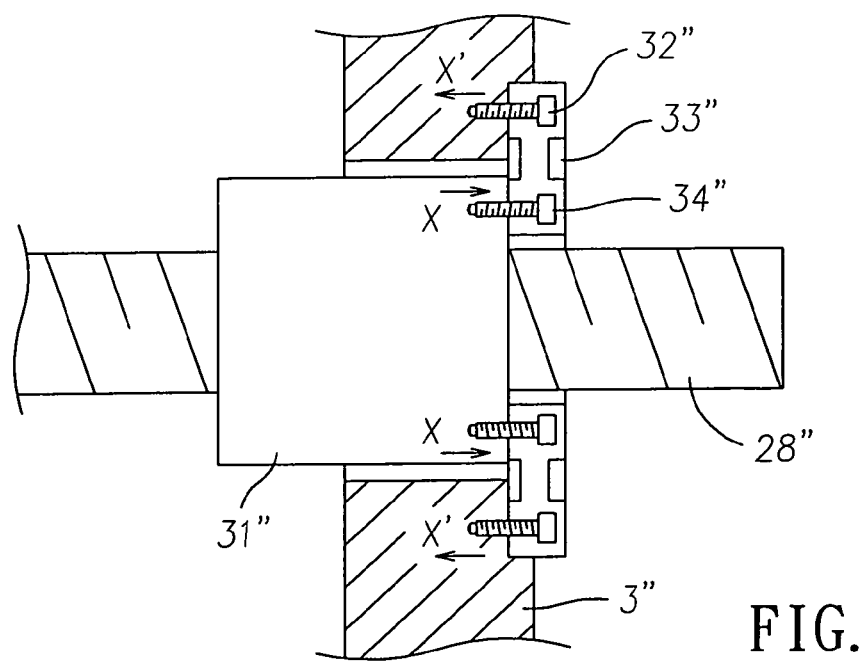
FIG. 4 is a view of force analysis of the load cell of the second embodiment in prior arts.
Figure 5:
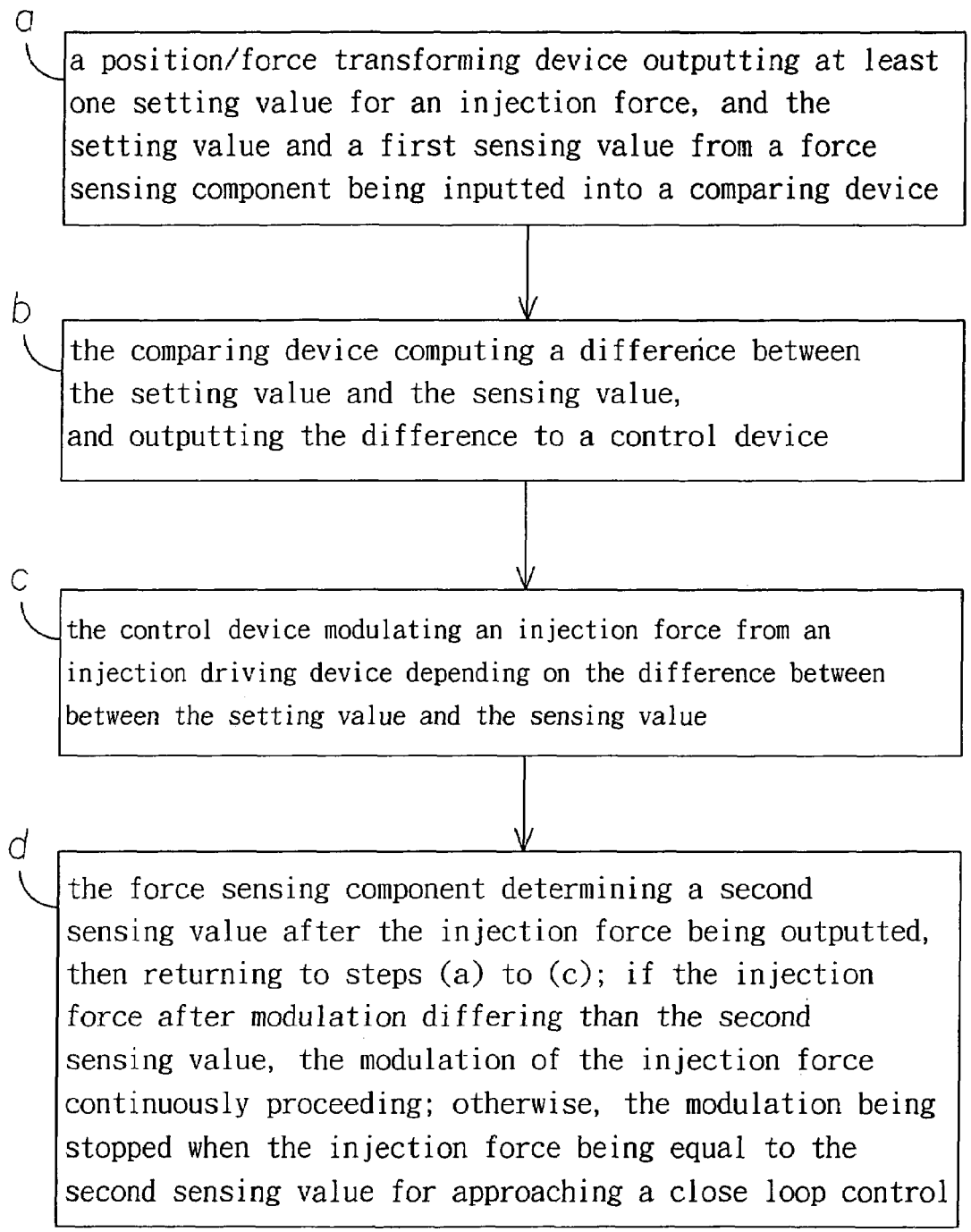
FIG. 5 is steps of the detecting method of the present invention.

FIG. 5 illustrated the steps of the detecting method fo the present invention, which includes the following steps:

(a) initially receiving at least one related pre-setting parameter signal for injection, metering and other parameters of an injection molding machine and at least one position signal for a encoder/optical meter capturing an injection screw, continuously a position/force transformer outputs a pre-setting injection pressure signal;
(b) a value of the pre-setting injection pressure signal and a first detecting value output form a load cell are imported into a comparator simultaneously;
(c) the comparator computes a difference between the value for the pre-setting injection pressure signal and the detecting value, and outputs the difference to a controller;
(d) the controller outputs a compensation signal to an injection servomotor to adjust an output injection force generating from the injection servomotor;
(e) while the injection servomotor driving the injection screw to move forward or back, the load cell detects a second detecting value differs with the value compensated by the injection servomotor, if the second detecting value differs with the value of the pre-setting injection pressure signal, steps (b) to (d) are repeated to continuously amend forces output from the injection servomotor, after a force value accepted by the load cell being equal to the value of the pre-setting injection pressure signal, an execution of a closed loop control of the injection screw is completed;
wherein aforesaid first detecting value is defined as that an injection force measured by the load cell for the previous loop of the above steps; the second detecting value is determined as that a new force value detected by the load cell after compensating the injection servomotor.

The new arrangement of the load cell successfully solves the shortcomings of the prior art, which is the signal without real value and the delayed response. The present invention is with the features of high precision and instantaneous response to effectively promote the performance. Therefore, the present invention has been examined to be progressive, advantageous and applicable to the industry.

Although the invention has been disclosed and illustrated with reference to particular embodiments, the principles involved are applicable to numerous other embodiments that will be apparent to persons skilled in the art. This invention is, therefore, to be limited only as indicated by the scope of the appended claims.

What is claimed is:

1. A force detecting controlling device of a screw for an injection molding machine, which being installed on an injection unit, the injection unit comprising:
    at least one front fixed plate having a penetrating hole center of the front fixed plate;
    at least one rear fixed plate installed parallel to said front fixed plate, and a center of the rear fixed plate having another penetrating hole to contain a force detecting component and a ball screw nut;
    at least two guiding rods installed between said front fixed plate and said rear fixed plate, and the two guiding rods being parallel each other;
    a moving plate being capable of sliding on said two guiding rods and a side of the moving plate connecting to a screw via a metering driving device and another side of the moving plate connecting to a ball screw via an injection driving device;
    a force detecting component comprising a load cell having an outside ring on the rear fixed plate by a set of bolts, and an inner ring of the load cell fixed on a ball screw nut by another set of bolts;
    wherein the injection driving device rotates said ball screw relative to the ball screw nut fixed on said force detecting component and drives said moving plate and said screw.

2. The force detecting controlling device of the screw for the injection molding machine as cited in claim 1, wherein the injection driving device includes an injection servomotor, a timing belt and a set of timing belt pulleys.

3. The force detecting controlling device of the screw for the injection molding machine as cited in claim 2, wherein the timing belt pulleys include a driving pulley and a driven pulley.

4. The force detecting controlling device of the screw for the injection molding machine as cited in claim 3, wherein said driving pulley is fastened on the ball screw via a tollock.

5. The force detecting controlling device of the screw for the injection molding machine as cited in claim 2, wherein the timing belt pulleys engage the timing belt and the injection servomotor drives the ball screw to rotate and axially move relative to the ball screw nut.

6. The force detecting controlling device of the screw for the injection molding machine as cited in claim 2, wherein the moving plate further includes an injection bearing housing, which contains a set of bearings.

7. The force detecting controlling device of the screw for the injection molding machine as cited in claim 1, wherein the metering driving device includes a metering servomotor, a timing belt and a set of timing belt pulleys.

8. The force detecting controlling device of the screw for the injection molding machine as cited in claim 7, wherein the timing belt pulleys include a driving pulley and a driven pulley.

9. The force detecting controlling device of the screw for the injection molding machine as cited in claim 8, wherein said driven pulley is fastened on a screw driving shaft via a key.

10. The force detecting controlling device of the screw for the injection molding machine as cited in claim 1, wherein said screw being installed by a half ring connected and fastened to a screw driving shaft via a spline plate.

11. The force detecting controlling device of the screw for the injection molding machine as cited in claim 8, wherein the timing belt pulleys engage the timing belt, and the metering servomotor drives said screw driving shaft to rotate said screw.

12. The force detecting controlling device of the screw for the injection molding machine as cited in claim 1, wherein the ball screw nut has no direct contact with the rear fixed plate.

13. The force detecting controlling device of the screw for the injection molding machine as cited in claim 1, wherein said ball screw rotates and reciprocates relative to said force detecting component fixed between the ball screw nut and said rear fixed plate.

14. The force detecting controlling device of the screw for the injection molding machine as cited in claim 1, wherein the force detecting component is fixed on the rear fixed plate and located a place where directly accepts injection pressure, holding pressure and back pressure of said screw.

* * * * *